United States Patent
Overman et al.

(10) Patent No.: US 11,828,469 B2
(45) Date of Patent: Nov. 28, 2023

(54) ADAPTIVE TRAPPED VORTEX COMBUSTOR

(71) Applicant: General Electric Company, Schenectady, NY (US)

(72) Inventors: Nicholas R. Overman, Sharonville, OH (US); Aaron J. Glaser, Cincinnati, OH (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 0 days.

(21) Appl. No.: 17/653,376

(22) Filed: Mar. 3, 2022

(65) Prior Publication Data

US 2023/0280034 A1   Sep. 7, 2023

(51) Int. Cl.
*F23R 3/58* (2006.01)
*F23R 3/12* (2006.01)

(52) U.S. Cl.
CPC . *F23R 3/58* (2013.01); *F23R 3/12* (2013.01)

(58) Field of Classification Search
CPC .... F23R 3/002; F23R 3/42; F23R 3/52; F23R 3/58; F23R 3/12
See application file for complete search history.

(56) References Cited

U.S. PATENT DOCUMENTS

| | | | |
|---|---|---|---|
| 3,742,703 A | 7/1973 | Melconian | |
| 4,532,762 A | 8/1985 | Mongia et al. | |
| 4,545,196 A | 10/1985 | Mongia et al. | |
| 4,720,970 A | 1/1988 | Hudson et al. | |
| 5,261,239 A * | 11/1993 | Barbier | F23R 3/04 60/731 |
| 7,500,347 B2 | 3/2009 | Sanders et al. | |
| 8,312,725 B2 | 11/2012 | Steele et al. | |
| 10,774,740 B2 | 9/2020 | Marmilic et al. | |
| 2016/0153365 A1 | 6/2016 | Fletcher et al. | |
| 2019/0120491 A1* | 4/2019 | Boardman | F23R 3/58 |
| 2019/0120493 A1* | 4/2019 | Boardman | F02C 3/14 |
| 2020/0393128 A1 | 12/2020 | Zelina et al. | |

FOREIGN PATENT DOCUMENTS

EP   2116766 A1 * 11/2009 ............. F02C 7/222

* cited by examiner

*Primary Examiner* — Steven M Sutherland
(74) *Attorney, Agent, or Firm* — Venable LLP; Elizabeth C. G. Gitlin; Michele V. Frank

(57) ABSTRACT

An adaptive trapped vortex combustor for a gas turbine engine includes a combustion chamber, a fuel injector, and one or more chutes. The combustion chamber is defined by an outer liner, an inner liner, and a dome, and includes a primary combustion zone within the combustion chamber defining a vortex cavity for a trapped vortex, the vortex cavity having a volume therein, a secondary combustion zone within the combustion chamber, and an opening from the primary combustion zone to the secondary combustion zone. The fuel injector injects a fuel into the primary combustion zone. The one or more chutes provide an air flow to the primary combustion zone and/or the secondary combustion zone. A feature of the adaptive trapped vortex combustor is controllable such that a residence time of the fuel in the vortex cavity is controllable based on an operating condition of the gas turbine engine.

20 Claims, 11 Drawing Sheets

ADAPTIVE TRAPPED VORTEX COMBUSTOR

TECHNICAL FIELD

The present disclosure relates to a trapped vortex combustor. In particular, the present disclosure relates to an adaptive trapped vortex combustor for a gas turbine engine.

BACKGROUND

A gas turbine engine includes a compressor for compressing air that is mixed with fuel and ignited in a combustor for generating combustion gases. The combustion gases flow to a turbine that extracts energy for driving a shaft to power the compressor and to produce output power. One type of combustor is a trapped vortex combustor that traps the air into a vortex to stabilize the combustion.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

The terms "forward" and "aft" refer to relative positions within a gas turbine engine, and refer to the normal operational attitude of the gas turbine engine. For example, with regard to a gas turbine engine, forward refers to a position closer to an engine inlet and aft refers to a position closer to an engine nozzle or exhaust.

The adaptive trapped vortex combustors, also referred to as ultra compact combustors, of the present disclosure provide variable volume combustors and/or variable flow combustors that provide optimization over a range of operating conditions. The adaptive trapped vortex combustors may allow for variation or movement of the outer liner, the inner liner, the dome, the fuel injector, a chute, a tapered body in the chute, or any combination thereof to provide the variable volume and/or variable flow. An actuator may passively and/or actively control the adaptiveness of the adaptive trapped vortex combustors.

Figure 1:
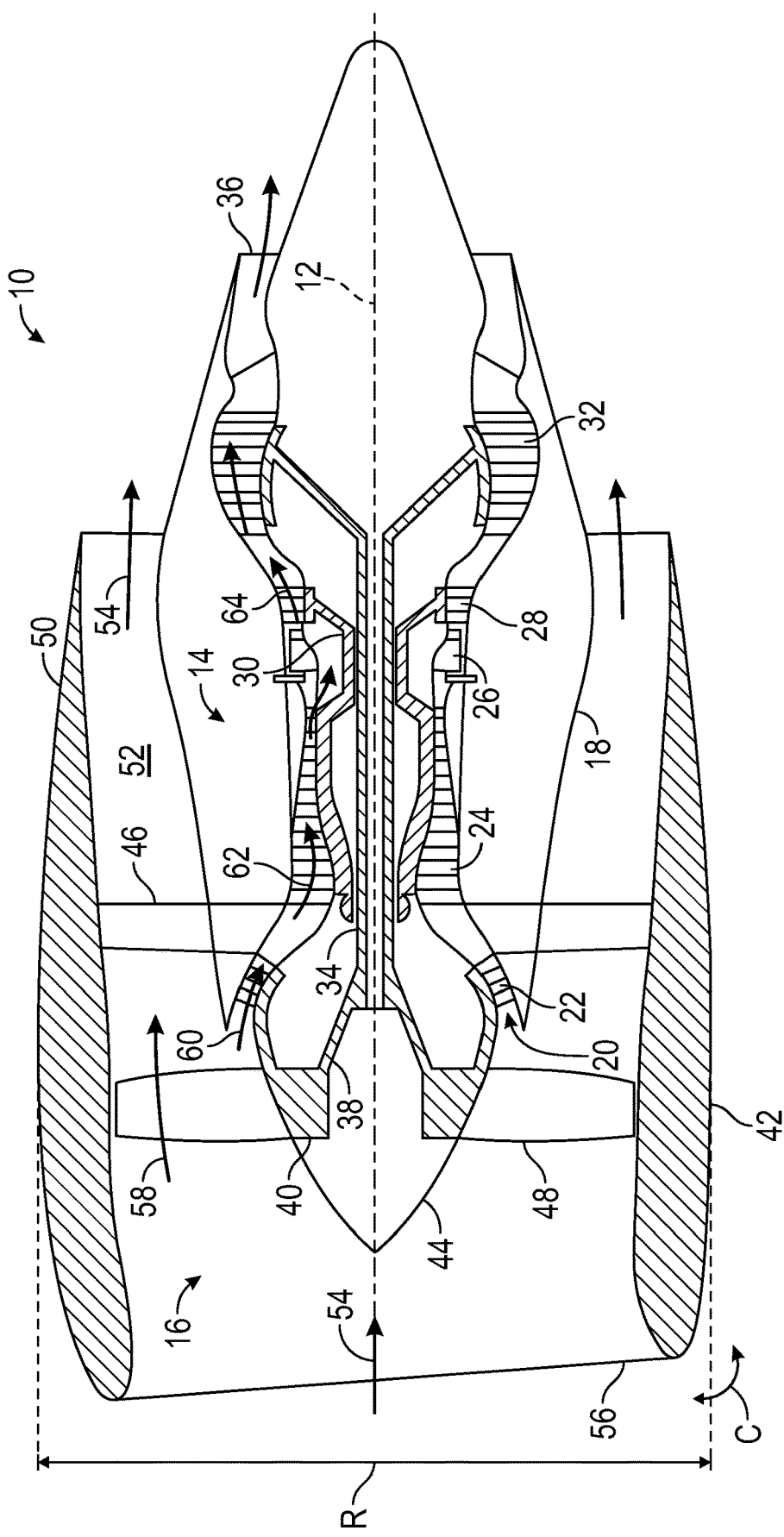
FIG. 1 shows a schematic, cross-sectional view of a gas turbine engine, taken along a centerline of the engine, according to an embodiment of the present disclosure.

Referring to FIG. 1, a gas turbine engine 10 has a longitudinal, axial centerline 12 extending therethrough along an axial direction A. The gas turbine engine 10 defines a radial direction R extending perpendicular from the centerline 12 and a circumferential direction C (shown in/out of the page in FIG. 1) extends perpendicular to both the centerline 12 and the radial direction R. The gas turbine engine 10 may be, for example, but not limited to, a gas turbine engine, a turbofan engine, an open rotor engine, a turboshaft engine, turbojet engine, or a turboprop configuration engine, including marine and industrial turbine engines and auxiliary power units.

The gas turbine engine 10 includes a core engine 14 and a fan section 16 positioned upstream thereof. The core engine 14 generally includes an outer casing 18 that defines an annular inlet 20. In addition, the outer casing 18 may further enclose and support a low-pressure compressor 22 for increasing the pressure of the air that enters the core engine 14 to a first pressure level. A multi-stage, high-pressure compressor 24 may then receive the pressurized air from the low-pressure compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. High energy combustion products 64 are directed from the combustor 26 along the hot gas path of the gas turbine engine 10 to a high-pressure turbine 28 for driving the high-pressure compressor 24 via a high-pressure shaft 30, also referred to as a shaft 30, and, then, to a low-pressure turbine 32 for driving the low-pressure compressor 22 and fan section 16 via a low-pressure shaft 34 that is generally coaxial with high-pressure shaft 30. After driving each of the high-pressure turbine 28 and the low-pressure turbine 32, the combustion products 64 may be expelled from the core engine 14 via an exhaust nozzle 36 to provide propulsive jet thrust.

Additionally, as shown in FIG. 1, the fan section 16 of the gas turbine engine 10 includes a rotatable, axial-flow, fan rotor 38 surrounded by an annular nacelle 42. In particular embodiments, the low-pressure shaft 34 may be connected directly to the fan rotor 38 or a rotor disk 40, such as in a direct-drive configuration. In alternative configurations, the low-pressure shaft 34 may be connected to the fan rotor 38 via a speed reduction device such as a reduction gear gearbox in an indirect-drive or geared-drive configuration. Such speed reduction devices may be included between any suitable shafts/spools within the gas turbine engine 10 as desired or required. Additionally, the fan rotor 38 and/or rotor disk 40 may be enclosed or formed as part of a fan hub 44.

The nacelle 42 may be supported relative to the core engine 14 by a plurality of substantially radially-extending, circumferentially-spaced outlet guide vanes 46. As such, the nacelle 42 may enclose the fan rotor 38 and a plurality of fan blades 48. Each of the fan blades 48 may extend between a root and a tip in the radial direction R relative to the centerline 12. A downstream section 50 of the nacelle 42 may extend over an outer portion of the core engine 14 so as to define a secondary airflow or bypass conduit 52 that provides additional propulsive jet thrust.

During operation of the gas turbine engine 10, an initial air flow 54 may enter the gas turbine engine 10 through an inlet 56 of the nacelle 42. The initial air flow 54 then passes through the fan blades 48 and splits into a first compressed air flow 58 that moves through the bypass conduit 52 and a second compressed air flow 60, also referred to as a core airflow 60, that enters the low-pressure compressor 22. The pressure of the core air flow 60 is then increased and enters the high-pressure compressor 24 as air flow 62. After mixing with fuel and being combusted within the combustor 26, the combustion products 64 exit the combustor 26 and flow through the high-pressure turbine 28. Thereafter, the combustion products 64 flow through the low-pressure turbine 32 and exit the exhaust nozzle 36 to provide thrust for the gas turbine engine 10.

Figure 2:
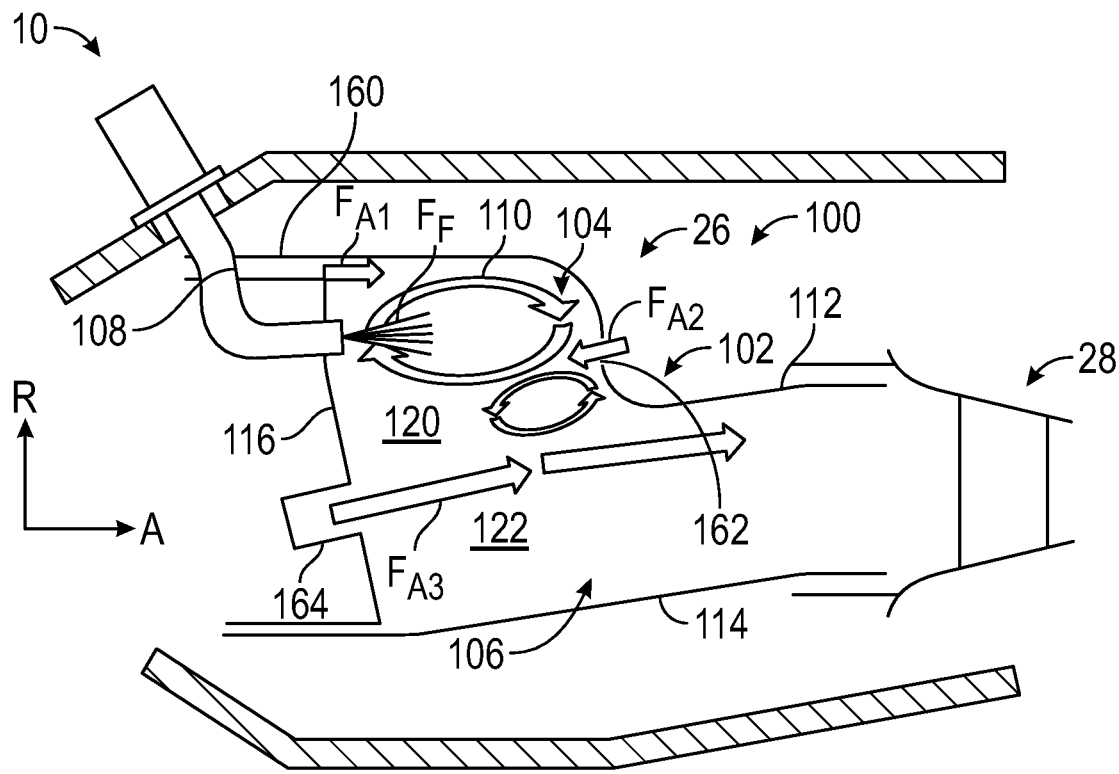
FIG. 2 shows a schematic, cross-sectional view of a trapped vortex combustor for a gas turbine engine, according to an embodiment of the present disclosure.

Referring to FIG. 2, the combustor 26 of the gas turbine engine 10 may be a trapped vortex combustor 100. The trapped vortex combustor 100 defines a combustion chamber 102 that may include a primary combustion zone 104 and a secondary combustion zone 106. A fuel injector 108 deposits a flow $F_F$ of liquid fuel or gaseous fuel into the combustion chamber 102 to define the primary combustion zone 104 within the combustion chamber 102. The fuel injector 108 may extend radially inward from an outer liner 112 of the trapped vortex combustor 100. The primary combustion zone 104 defines an annular trapped vortex 110 in a primary cavity 120, also referred to as a vortex cavity 120. The secondary combustion zone 106 defines a secondary cavity 122. The trapped vortex combustor 100 includes the outer liner 112, an inner liner 114, and a dome 116.

Still referring to FIG. 2, a first air flow $F_{A1}$ may enter the primary cavity 120 of the combustion chamber 102 via a first chute or first passage 160. The first air flow $F_{A1}$ may enter the primary cavity 120 from an axially forward end of the vortex cavity 120 of the trapped vortex combustor 100. That is, the first air flow $F_{A1}$ may enter near the dome 116. A second air flow $F_{A2}$ may enter the vortex cavity 120 of the combustion chamber 102 via a second chute or second passage 162. The second air flow $F_{A2}$ may enter the primary cavity 120 from an axially aft end of the vortex cavity 120 of the trapped vortex combustor 100. That is, the first air flow $F_{A2}$ may enter through the outer liner 212. The first air flow $F_{A1}$ and the second air flow $F_{A2}$ may enter the vortex cavity 120 on axially opposing sides of the vortex cavity 120. A third air flow $F_{A3}$ may enter the secondary cavity 122 through the dome 116. For example, the third air flow $F_{A3}$ may enter through a third chute or diffuser 164 located in or at the dome 116.

The fuel flow $F_F$ and the air flows $F_{A1}$, $F_{A2}$, and $F_{A3}$ may combine to combust in the trapped vortex combustor 100 in a known manner. The combustion products may flow through the trapped vortex combustor 100 to the high-pressure turbine 28.

The trapped vortex combustors of the present disclosure may be adaptive trapped vortex combustors and may have a variable volume vortex cavity and/or a variable flow. The volume and/or the flow may be increased or decreased to any power condition. The variable volume and/or the variable flow may be adapted to any power condition between minimum light-off condition and maximum power condition. Adapting the variable volume and/or the variable flow may balance efficiency, smoke, NOx, lean blowout, relight, and/or pressure drop.

FIGS. 3 to 6 illustrate various adaptive trapped vortex combustors that may be the combustor 26 and/or the trapped vortex combustor 100. The adaptive trapped vortex combustors described with respect to FIGS. 3 to 6 allow for a variable volume in the vortex cavity. Any of the adaptive trapped vortex combustors described in FIGS. 3 to 6 and any individual component or feature thereof may be combined with other trapped vortex combustors described herein. The movement described in FIGS. 3 to 6 is relative motion of the moving part with respect to an outer case and/or an inner case of the adaptive trapped vortex combustors. The movement described in FIGS. 3 to 6 may be actively and/or passively driven.

Figure 3:
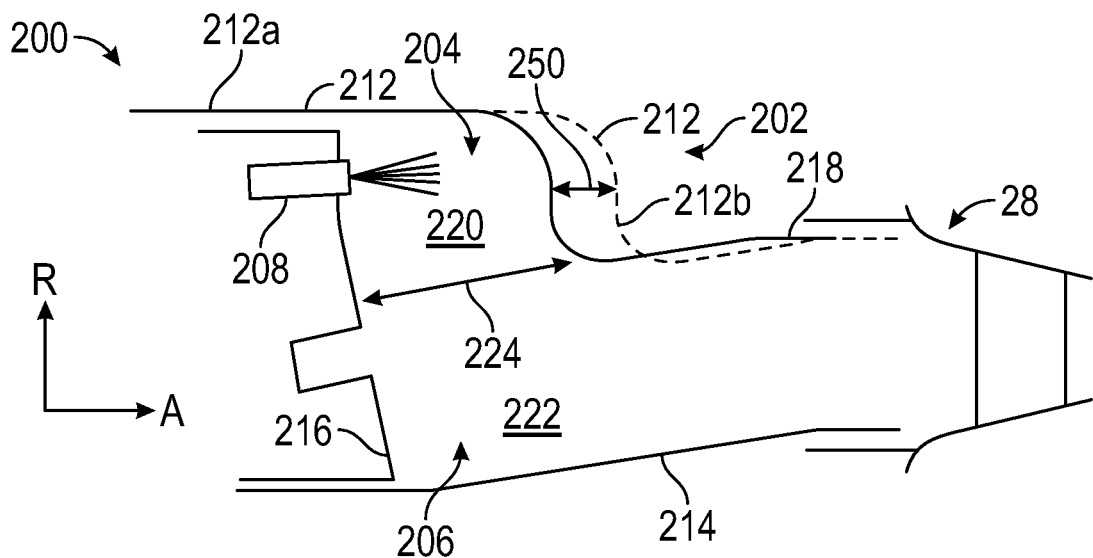
FIG. 3 shows a schematic view of a trapped vortex combustor for a gas turbine engine, according to an embodiment of the present disclosure.

FIG. 3 illustrates a schematic view of an adaptive trapped vortex combustor 200. The adaptive trapped vortex combustor 200 defines a combustion chamber 202 that may include a primary combustion zone 204 and a secondary combustion zone 206. A fuel injector 208 deposits a flow into the combustion chamber 202 to define the primary combustion zone 204 within the combustion chamber 202. The fuel injector 208 may extend radially inward from an outer liner 212 of the adaptive trapped vortex combustor 200. The primary combustion zone 204 defines a primary cavity 220, also referred to as a vortex cavity 220. The secondary combustion zone 206 defines a secondary cavity 222. The adaptive trapped vortex combustor 200 includes the outer liner 212, an inner liner 214, and a dome 216.

The vortex cavity 220 of FIG. 3 may be of a variable volume. That is, the outer liner 212 may be moved axially to adjust the volume of the vortex cavity 220. For example, the outer liner 212 may be moved from a first outer liner position 212a by a distance 250 to a second outer liner position 212b. Therefore, the volume of the vortex cavity 220 may be increased and/or decreased by the volume present in the space of distance 250. As the outer liner 212 is moved toward the second outer liner position 212b, the volume may increase. As the outer liner 212 is moved toward the first outer liner position 212a, the volume may decrease. An axially aft end 218 of the outer liner 212 may be allowed to move relatively with respect to the high-pressure turbine 28. Since the outer liner 212 is allowed to move axially, an opening 224 of the vortex cavity 220 may be a variable opening. That is, as the outer liner 212 is moved between the first outer liner position 212a and the second outer liner position 212b (any points therebetween), the opening 224 changes. As the outer liner 212 is moved toward the second outer liner position 212b, the opening 224 becomes larger. As the outer liner 212 is moved toward the first outer liner position 212a, the opening 224 becomes smaller.

Figure 4:
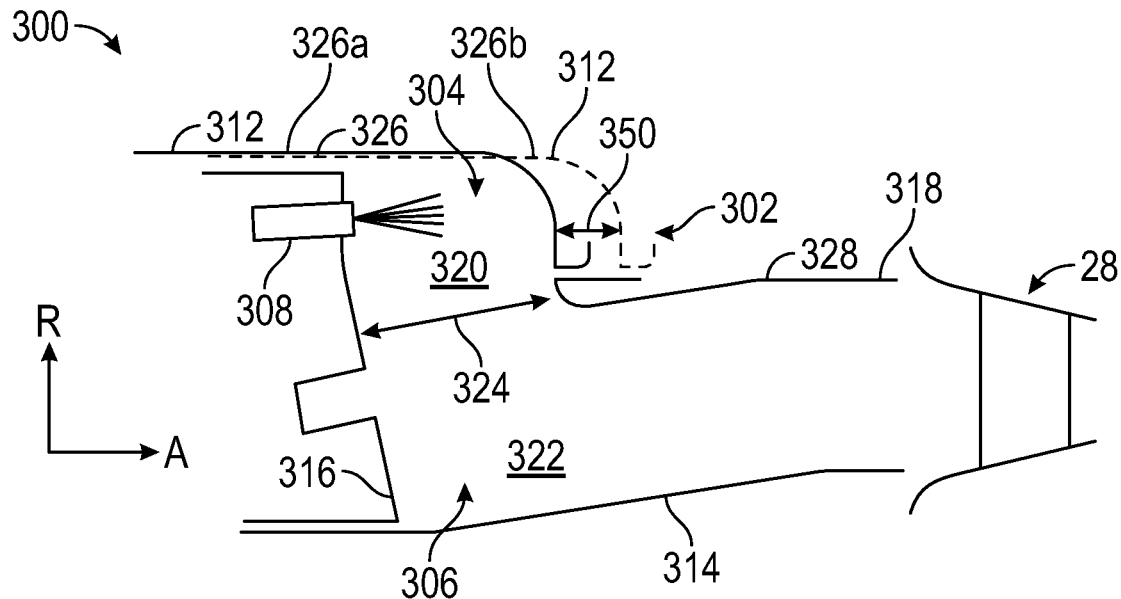
FIG. 4 shows a schematic view of a trapped vortex combustor for a gas turbine engine, according to an embodiment of the present disclosure.

FIG. 4 illustrates a schematic view of an adaptive trapped vortex combustor 300. The adaptive trapped vortex combustor 300 defines a combustion chamber 302 that may include a primary combustion zone 304 and a secondary combustion zone 306. A fuel injector 308 deposits a flow into the combustion chamber 302 to define the primary combustion zone 304 within the combustion chamber 302. The fuel injector 308 may extend radially inward from an outer liner 312 of the adaptive trapped vortex combustor 300. The primary combustion zone 304 defines a primary cavity 320, also referred to as a vortex cavity 320. The secondary combustion zone 306 defines a secondary cavity 322. The adaptive trapped vortex combustor 300 includes the outer liner 312, an inner liner 314, and a dome 316. The outer liner 312 includes a first outer liner part 326 and a second outer liner part 328.

The vortex cavity 320 of FIG. 4 may be of a variable volume. That is, the first outer liner part 326 may be moved axially to adjust the volume of the vortex cavity 320. For example, the first outer liner part 326 may be moved from a first outer liner position 326a by a distance 350 to a second outer liner position 326b. Therefore, the volume of the vortex cavity 320 may be increased and/or decreased by the volume present in the space of distance 350. As the first outer liner part 326 is moved toward the second outer liner position 326b, the volume may increase. As the first outer liner part 326 is moved toward the first outer liner position 326a, the volume may decrease. An axially aft end 318 of the second outer liner part 328 of the outer liner 312 may be allowed to move relatively with respect to the high-pressure turbine 28. Since the first outer liner part 326 of the outer liner 312 is allowed to move axially, but the second outer liner part 328 is fixed, an opening 324 of the vortex cavity 320 may be a fixed opening. That is, as the first outer liner part 326 of the outer liner 312 is moved between the first outer liner position 326a and the second outer liner position 326b (any points therebetween), the opening 224 remains constant or fixed.

FIG. 3 illustrates an example with an adaptive trapped vortex combustor 200 having a variable volume (e.g., a volume of vortex cavity 220 may be increased and/or decreased) and having a variable opening (e.g., the opening 224 may be increased and/or decreased along with the volume of the vortex cavity 220). On the other hand, FIG. 4 illustrates an example with an adaptive trapped vortex combustor 300 having a variable volume (e.g., a volume of vortex cavity 320 may be increased and/or decreased) and having a fixed opening (e.g., the opening 224 does not change along with the volume of the vortex cavity 220).

Accordingly, as shown in FIGS. 3 and 4, though the primary vortex zone may change volume, the exit of the primary zone may be permitted to move with the volume or may be fixed. In the example of the fixed exit (FIG. 4), the area between the primary zone exit (e.g., opening 324) and the secondary zone (e.g., secondary combustion zone 306) remains relatively constant. Some area variation may, however, be expected due to thermal growth differences between parts. Additionally, the dome of FIGS. 3 and 4 may be moveable with respect to the diffuser (e.g., chute 164 of FIG. 2). The distribution of passage recoveries or pressure recoveries between the dome and the diffuser may change when the dome is in the first dome position and the second dome position, and positions therebetween.

Figure 5:
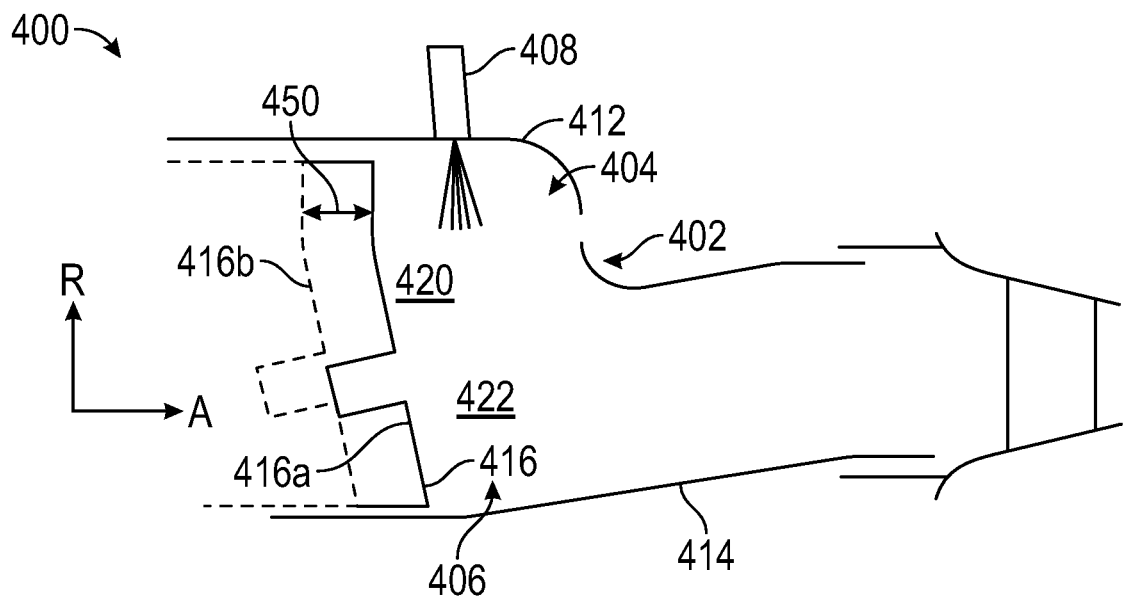
FIG. 5 shows a schematic view of a trapped vortex combustor for a gas turbine engine, according to an embodiment of the present disclosure.
Figure 6:
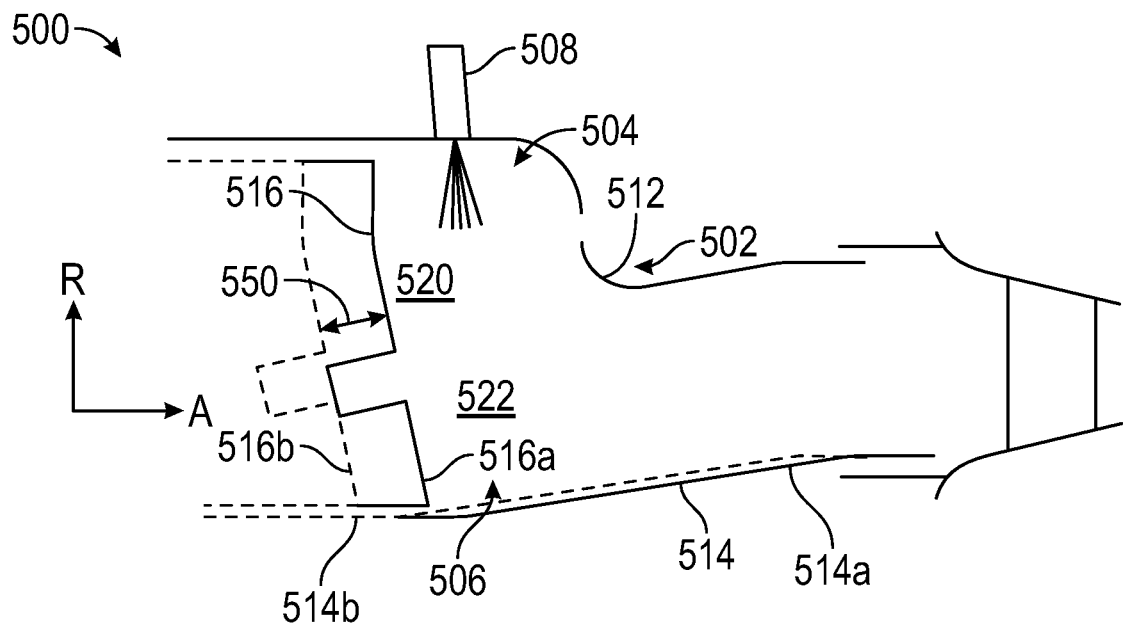
FIG. 6 shows a schematic view of a trapped vortex combustor for a gas turbine engine, according to an embodiment of the present disclosure.

FIGS. 5 and 6 illustrate alternative manners to effectuate a change in the volume of the vortex cavity. As described with respect to FIG. 4, the outer liner 312 may be moved. In the example of FIG. 5, the dome may be moved. In the example of FIG. 6, the dome and the inner liner may be moved. Any or all of the manners to effectuate a change in the volume as described in FIGS. 3 to 6 may be employed, in part or in whole, in any of the trapped vortex combustors described herein.

Referring first to FIG. 5, an adaptive trapped vortex combustor 400 defines a combustion chamber 402 that may include a primary combustion zone 404 and a secondary combustion zone 406. A fuel injector 408 deposits a fuel flow into the combustion chamber 402 to define the primary combustion zone 404 within the combustion chamber 402. The fuel injector 408 may extend radially inward from an outer liner 412 of the adaptive trapped vortex combustor 400. The primary combustion zone 404 defines a primary cavity 420, also referred to as a vortex cavity 420. The secondary combustion zone 406 defines a secondary cavity 422. The adaptive trapped vortex combustor 400 includes the outer liner 412, an inner liner 414, and a dome 416.

The vortex cavity 420 of FIG. 5 may be of a variable volume. That is, the dome 416 may be moved axially to adjust the volume of the vortex cavity 420. For example, the dome 416 may be moved from a first dome position 416a by a distance 450 to a second dome position 416b. Therefore, the volume of the vortex cavity 420 may be increased and/or decreased by the volume present in the space of distance 450. As the dome 416 is moved toward the second dome position 416b, the volume may increase. As the dome 416 is moved toward the first dome position 416a, the volume may decrease.

Since the dome 416 is allowed to move axially, an opening of the vortex cavity 420 may be a variable opening, such as described with respect to the outer liner of FIG. 3. Alternatively, the dome 416 may be formed such that the opening is fixed, such as described with respect to the outer liner of FIG. 4.

Referring to FIG. 6, an adaptive trapped vortex combustor 500 defines a combustion chamber 502 that may include a primary combustion zone 504 and a secondary combustion zone 506. A fuel injector 508 deposits a fuel flow into the combustion chamber 502 to define the primary combustion zone 504 within the combustion chamber 502. The fuel injector 508 may extend radially inward from an outer liner 512 of the adaptive trapped vortex combustor 500. The primary combustion zone 504 defines a primary cavity 520, also referred to as a vortex cavity 520. The secondary combustion zone 506 defines a secondary cavity 522. The adaptive trapped vortex combustor 500 includes the outer liner 512, an inner liner 514, and a dome 516.

The vortex cavity 520 of FIG. 6 may be of a variable volume. That is, the dome 516 and the inner liner 514 may be moved axially to adjust the volume of the vortex cavity 520. For example, the dome 516 and the inner liner 514 may be moved from a first dome position 516a and a first inner liner position 514a by a distance 550 to a second dome position 516b and a second inner liner position 514b, respectively. Therefore, the volume of the vortex cavity 520 may be increased and/or decreased by the volume present in the space of distance 550. As the dome 516 and the inner liner 514 are moved toward the second dome position 516b and the second inner liner position 514b, respectively, the volume may increase. As the dome 516 and the inner liner 514 are moved toward the first dome position 516a and the first inner liner position 514a, respectively, the volume may decrease.

Since the dome 516 and the inner liner 514 are allowed to move axially, an opening of the vortex cavity 520 may be a variable opening, such as described with respect to the outer liner of FIG. 3. Alternatively, the dome 516 and/or the inner liner 514 may be formed such that the opening is fixed, such as described with respect to the outer liner of FIG. 4.

Accordingly, as described with respect to FIGS. 3 and 4, the outer liner may be translated to change vortex primary zone volume (e.g., the volume of the vortex cavity), while the dome and the inner liner positions remain fixed relative to the combustor case. Additionally, as described with respect to FIGS. 5 and 6, the dome may be translated to change vortex primary zone volume, while the outer liner remains fixed relative to the combustor case. In some examples, the inner liner may be permitted to translate with the dome (FIG. 6) or may remain fixed (FIG. 5) with respect to the combustor case. "Fixed" is a relative term meaning mounted to the inner case and/or the outer case, although those skilled in the art will recognize there will be some motion due to thermal growth and/or mechanical loading such as a pressure drop across the liners or a mechanical load through the engine.

The dome proximity to the diffuser exit may also be used to change a distribution of pressure recoveries between the dome and the outer/inner passage as a method of changing flow combustor flow splits.

Figure 7A:
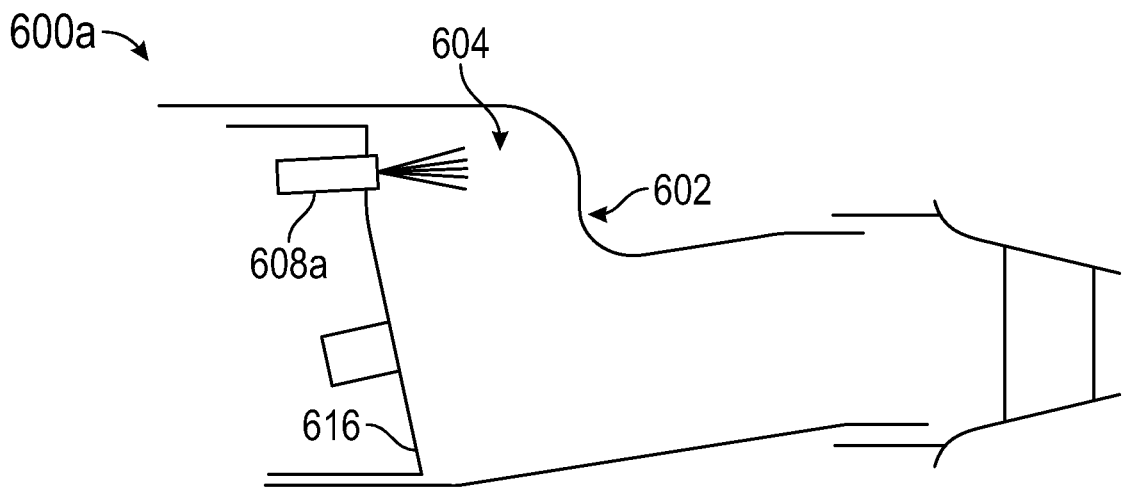
FIG. 7A shows a schematic view of a trapped vortex combustor for a gas turbine engine, according to an embodiment of the present disclosure.
Figure 7B:
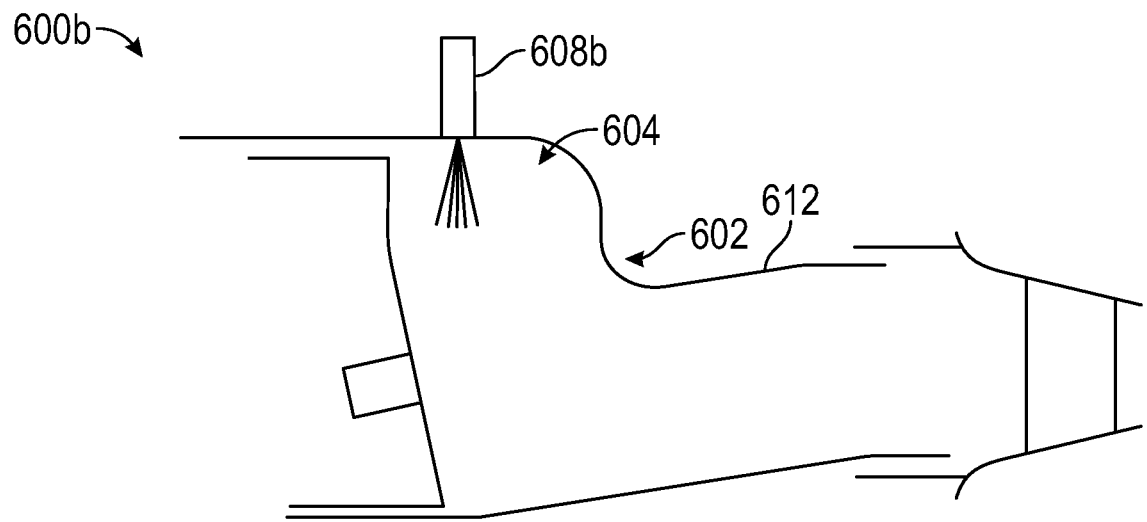
FIG. 7B shows a schematic view of a trapped vortex combustor for a gas turbine engine, according to an embodiment of the present disclosure.
Figure 7C:
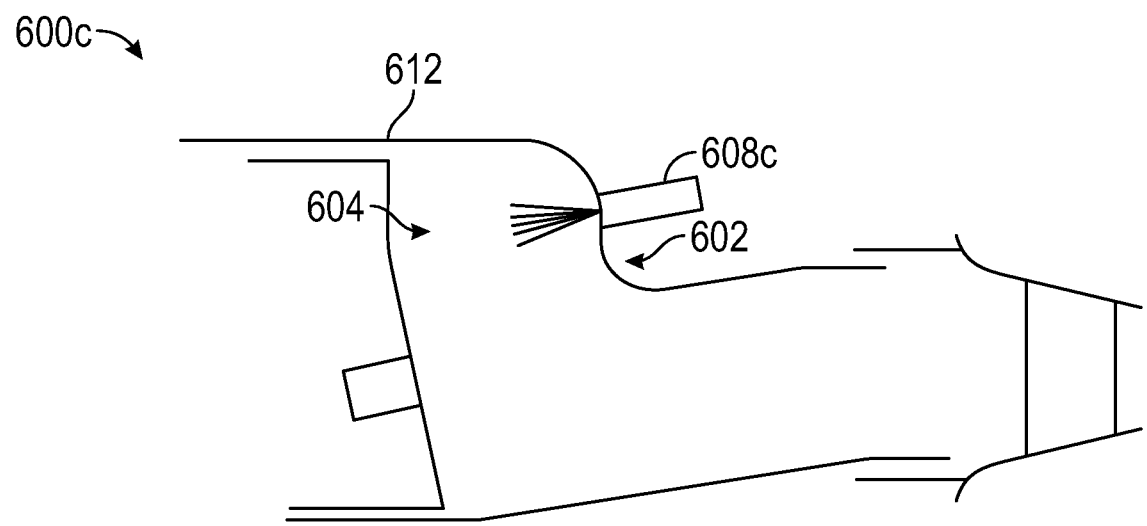
FIG. 7C shows a schematic view of a trapped vortex combustor for a gas turbine engine, according to an embodiment of the present disclosure.

FIGS. 7A to 7C illustrate locations of a fuel injector within the adaptive trapped vortex combustors of FIGS. 3 to 6 and FIGS. 8 to 10B. Thus, the locations of the fuel injectors in FIGS. 7A to 7C may be included in any or all of the trapped vortex combustors described herein. For example, in FIG. 7A, the combustor 600a includes a fuel injector 608a located at a forward end of the combustor 600a. That is, the fuel injector 608a injects fuel at a forward face of the combustor 600a. The fuel injector 608a may be located in or at the dome 616. The fuel injector 608a may inject fuel in an axial direction into the primary combustion zone 604 of the combustion chamber 602. In FIG. 7B, the combustor 600b includes a fuel injector 608b located in an outer liner 612 of the combustor 600b. The fuel injector 608b injects fuel at an outer face of the combustor 600b. The fuel injector 608b may be located in or at the outer liner 612. The fuel injector 608b may inject fuel in a radial direction into the primary combustion zone 604 of the combustion chamber 602. In FIG. 7C, the combustor 600c includes a fuel injector 608c located at an aft end of the primary combustion zone 604 of the combustion chamber 602 of the combustor 600a. The fuel injector 608c injects fuel at an aft face of the combustor 600c. The fuel injector 608c may be located in or at the outer liner 612. The fuel injector 608c may inject fuel in an axial direction into the primary combustion zone 604 of the combustion chamber 602.

Accordingly, as shown in FIGS. 7A to 7C, the fuel injector may be mounted on a forward face, a top face, and/or an aft face of the combustor and may further be attached to an outer case of the combustor. In an instance of top mounting (e.g., FIG. 7B), a slot with a sufficient length is utilized to allow a fixed fuel injector position unactuated with regard to the dome, although, as mentioned, some relative movement may be expected, as known in the art, due to thermal growth variations.

While FIGS. 3 to 6 describe a variable volume combustor, FIGS. 8 to 10B describe a variable flow from the vortex cavity. Any of the adaptive trapped vortex combustors described with respect to FIGS. 8 to 10B and any individual component or feature thereof may be combined with other trapped vortex combustors described herein. Any of the variable volume combustors of FIGS. 3 to 6 may be combined with any of the variable flow combustors of FIGS. 8 to 10B to provide an adaptive trapped vortex combustor that includes a variable volume and a variable flow.

Figure 8:
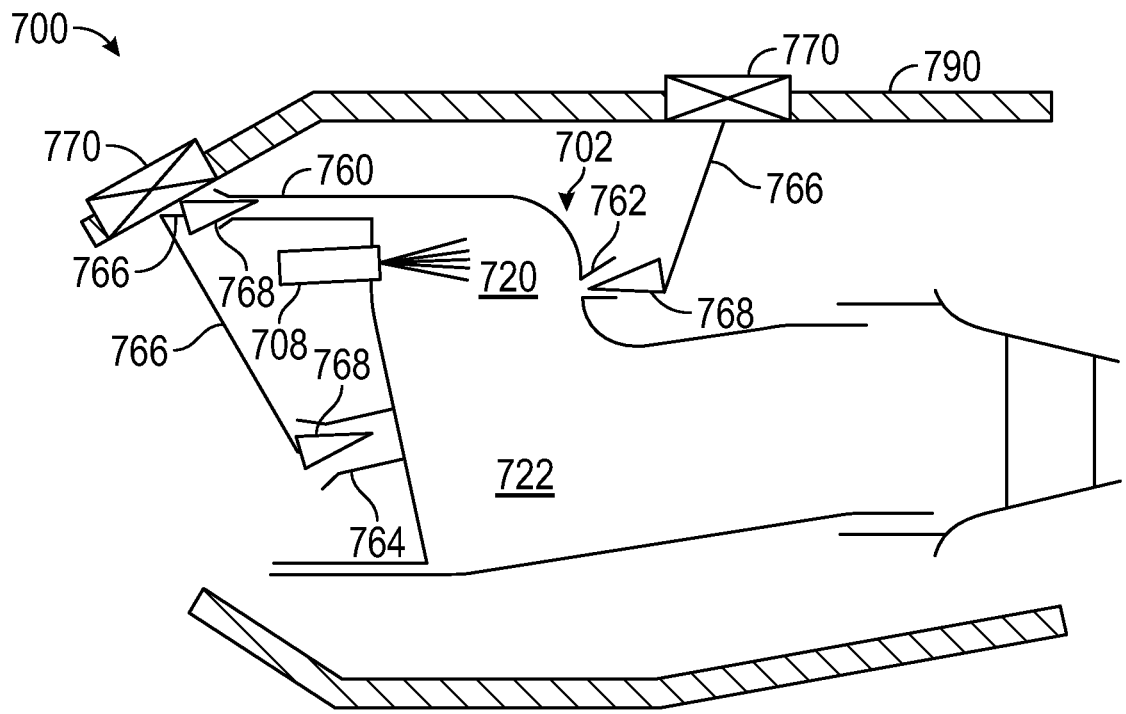
FIG. 8 shows a schematic view of a trapped vortex combustor for a gas turbine engine, according to an embodiment of the present disclosure.

Referring first to FIG. 8, an adaptive trapped vortex combustor 700 may include a plurality of slots or chutes that allow air flow into the combustion chamber 702. For example, a first chute 760 may enter the combustion chamber 702 at a forward side of a first cavity 720, also referred to as a vortex cavity 720, of the combustion chamber 702. A second chute 762 may enter the combustion chamber 702 at an aft side of the vortex cavity 720 of the combustion chamber 702. A third chute 764 may enter the secondary cavity 722 at a forward side of the secondary cavity 722. A fuel injector 708 injects fuel into the vortex cavity 720.

FIG. 8 further illustrates a support arm 766 and a tapered body 768 leading toward each of the first chute 760, the second chute 762, and the third chute 764. The support arms 766 are coupled to the tapered bodies 768 for support thereof. The tapered bodies 768 may be flow actuation devices. The tapered body 768 may be actuated, via the respective support arms 766, to vary the flow area through the first chute 760, the second chute 762, and/or the third chute 764. That is, the tapered body 768 may be moved linearly with respect to the respective chute to adjust an opening therein through which the air may flow. One or more actuators 770 may be mounted in the outer case 790. The one or more actuators 770 may be activated to actuate the movement of the tapered bodies 768. The tapered bodies 768 may be actuated simultaneously and/or independently.

Although shown schematically as an arrow and a triangular shape, the tapered bodies 768 may allow for flow therethrough, such that the air may flow therethrough and through the respective chutes. Although shown and described with each of the chutes including the tapered body 768, only one chute or a combination of chutes may include the tapered body 768.

The support arms 766 and the tapered bodies 768 may form chutes and/or driver slots that have a tapered body that traverse in and out of a respective chute (e.g., the first chute 760, the second chute 762, the third chute 764) to vary flow therethrough. In some examples, the tapered body 768 may be a radial flap and/or an axial flap that may vary inlet blockage to the respective chutes. The support arms 766 and/or tapered bodies 768 may be actuated actively or passively, similar to the liner actuation methods described with respect to FIGS. 11A to 12D.

Although the tapered bodies 768 are shown, this is only one example, and other methods or constructions to provide selective blockage of the chutes may include, but are not limited to, rotational blockages and/or radial blockages. One such method, for example, may include perforated plates in front of driver holes that rotate to open or to close the driver hole area. Another method, for example, may include segments that translate radially to open and/or to close the driver hole area.

Figure 9:
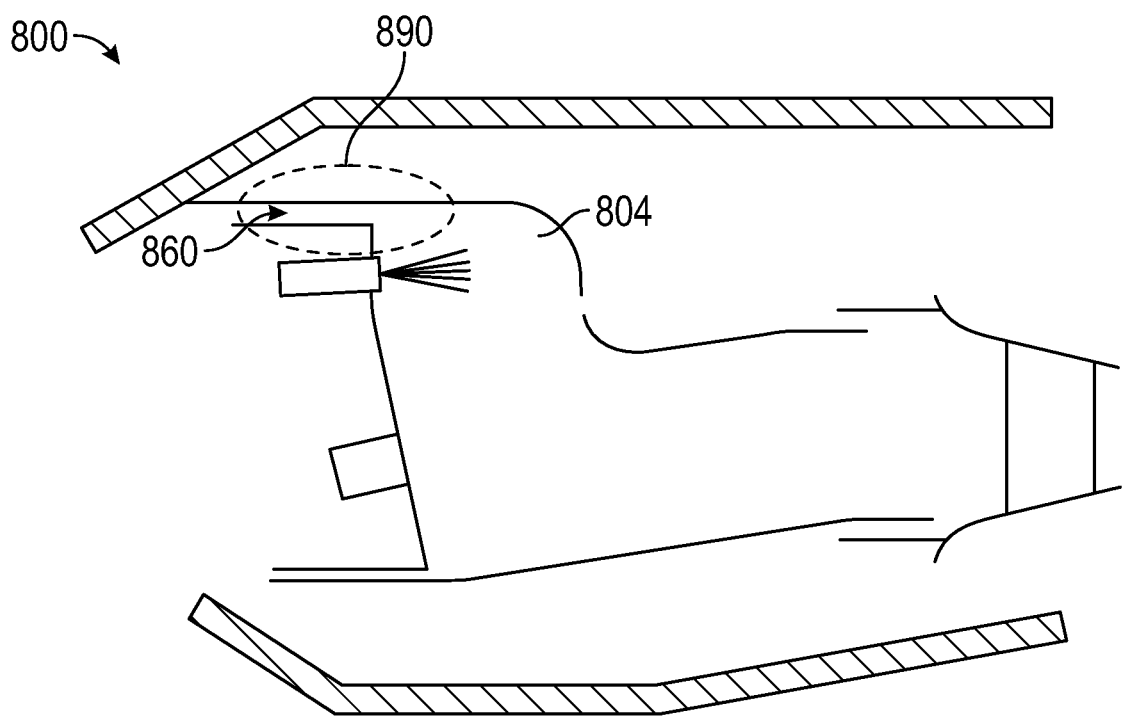
FIG. 9 shows a schematic view of a trapped vortex combustor for a gas turbine engine, according to an embodiment of the present disclosure.
Figure 10A:
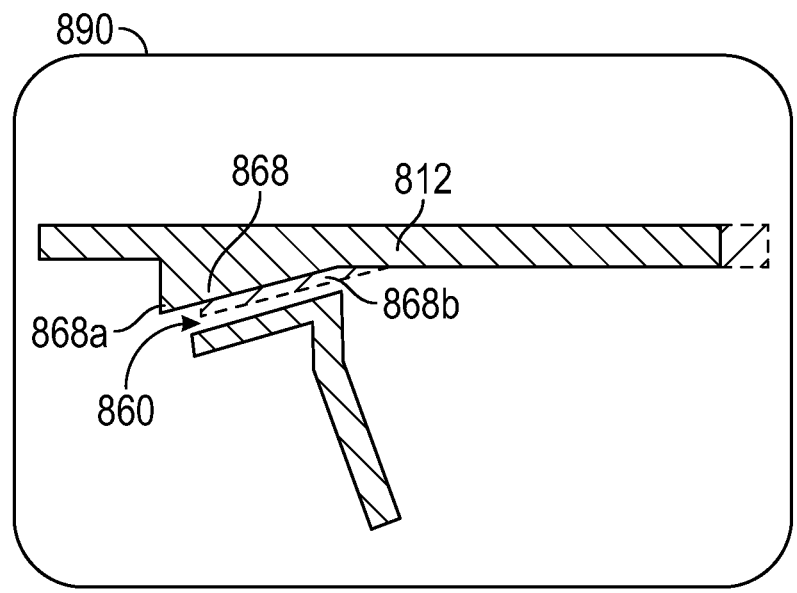
FIG. 10A shows a partial schematic, cross-sectional view of a portion of the trapped vortex combustor for a gas turbine engine, according to an embodiment of the present disclosure.
Figure 10B:
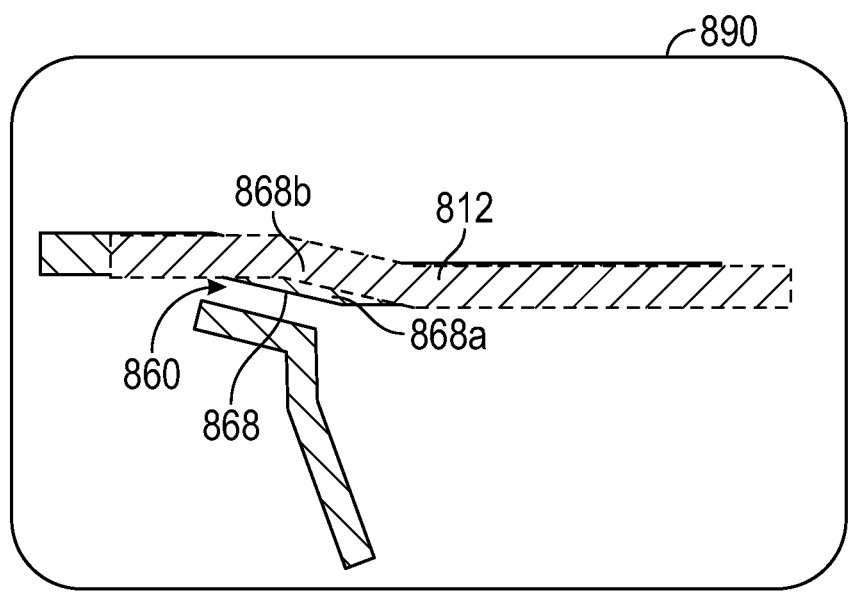
FIG. 10B shows a partial schematic, cross-sectional view of a portion of the trapped vortex combustor for a gas turbine engine, according to an embodiment of the present disclosure.

FIGS. 9, 10A, and 10B illustrate exemplary structures that may effectuate the selective passage of air flow through the chutes, as described with respect to FIG. 8. In the combustor 800 of FIG. 9, the first chute may allow flow into the primary combustion zone 804, such as described with respect to prior figures. An enlarged portion 890, shown in detail in FIGS. 10A and 10B, may include a tapered body 868 that extends into a chute 860. The tapered body 868 may move between a first position 868a and a second position 868b to selectively control the flow of air through the chute 860. The tapered body 868 may be a profile of the outer liner 812 that is configured to translate with respect to the chute 860. Although shown for the chute 860, the tapered body 868 may be provided in other air chutes in the combustor.

As mentioned, the tapered bodies may be passively actuated. That is, conditions of the combustor or operations of the engine may control the movement of the tapered bodies. For example, in FIG. 10A, the tapered body 868 may open with an increase in the volume of the vortex cavity. In FIG. 10B, the tapered body 868 may open with a decrease in the volume of the vortex cavity. Chutes and/or driver slots maybe be tapered or otherwise may be a shaped translation of the liner. This may also achieve a varying flow either proportionally or inversely proportional to the cavity volume.

Figure 11A:
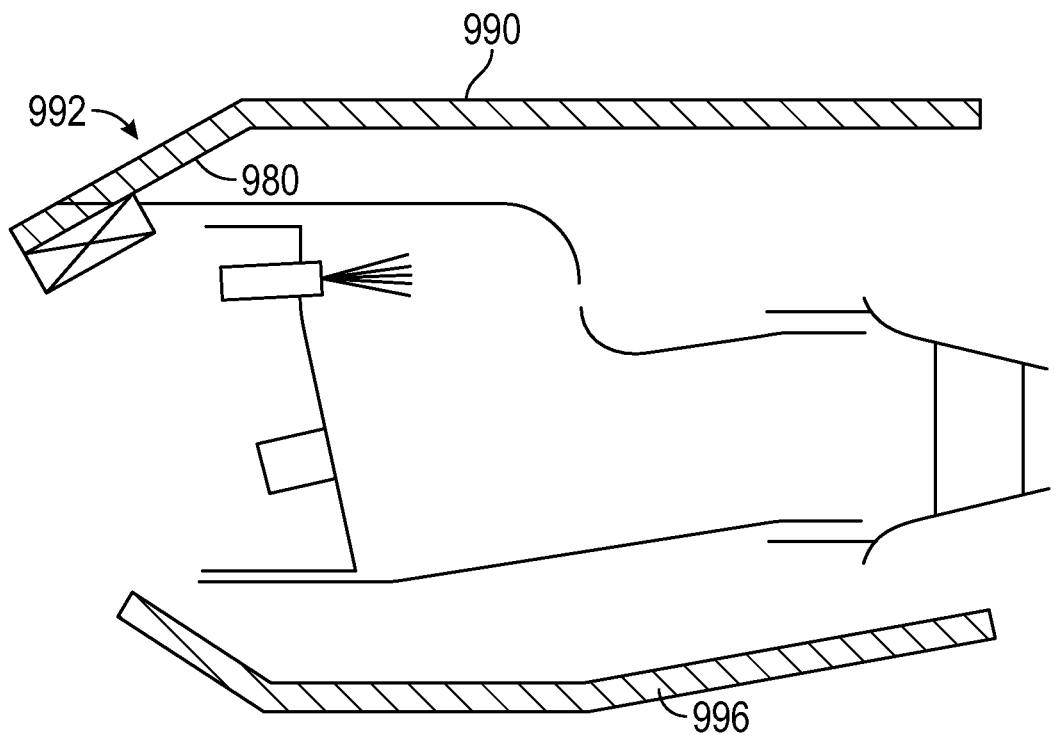
FIG. 11A shows a schematic, cross-sectional view of a trapped vortex combustor for a gas turbine engine, according to an embodiment of the present disclosure.
Figure 11B:
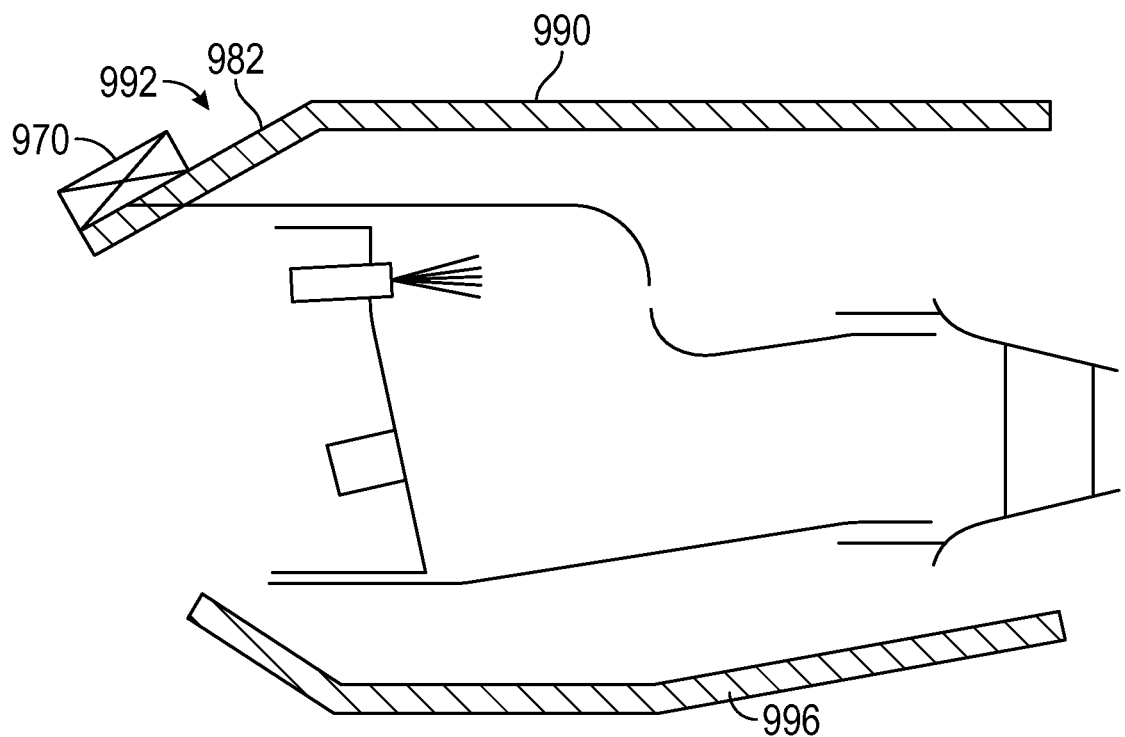
FIG. 11B shows a schematic, cross-sectional view of a trapped vortex combustor for a gas turbine engine, according to an embodiment of the present disclosure.
Figure 11C:
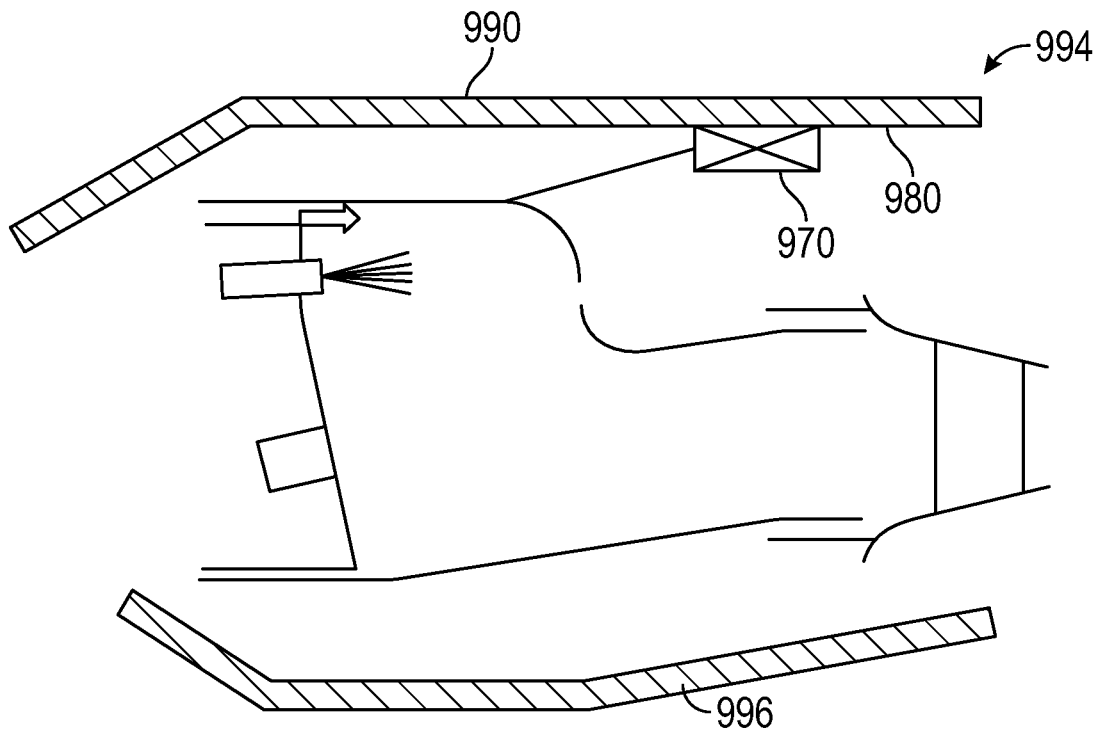
FIG. 11C shows a schematic, cross-sectional view of a trapped vortex combustor for a gas turbine engine, according to an embodiment of the present disclosure.
Figure 11D:
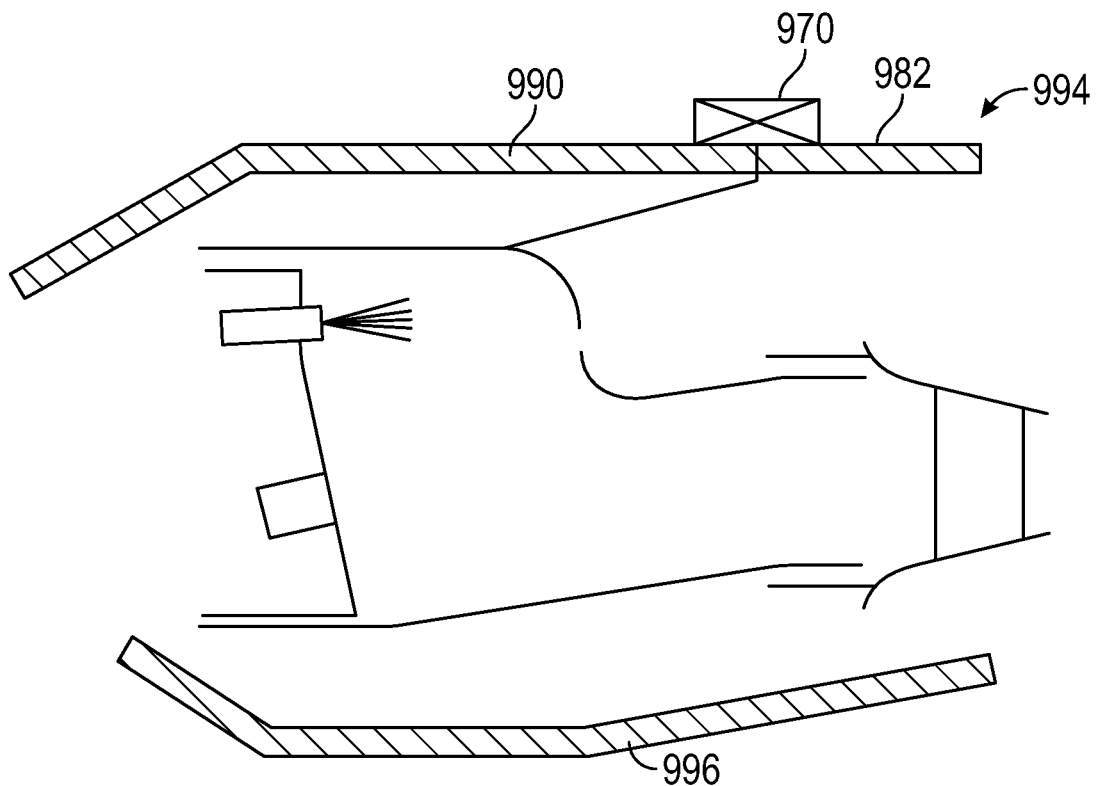
FIG. 11D shows a schematic, cross-sectional view of a trapped vortex combustor for a gas turbine engine, according to an embodiment of the present disclosure.

FIGS. 11A to 11D illustrate various exemplary actuation methods and locations that may be employed with the actuation of the outer liner, the inner liner, the dome, and/or the chutes, as described previously herein. For example, in FIG. 11A, an actuator 970 may be mounted to an interior surface 980 at a forward end 992 of an outer case 990. In FIG. 11B, the actuator 970 may be mounted to an exterior surface 982 at the forward end 992 of the outer case 990. In FIG. 11C, the actuator 970 may be mounted to the interior surface 980 at an aft end 994 of the outer case 990. In FIG. 11D, the actuator 970 may be mounted to the exterior surface 982 at the aft end 994 of the outer case 990. Although shown mounted to the outer liner, the actuator 970 may be mounted to any of the features described herein that are configured to move. Furthermore, any of the positions of the actuator 970 may be applied to the inner case 996 as well.

Therefore, as shown in FIGS. 11A to 11D, the actuator may be mounted to the outer case 990 and/or the inner case 996, either on the inside (e.g., on interior surface 980) or on the outside (e.g., on exterior surface 982). The actuator 970 may be connected to liner support arms. The actuator 970 may be independent. The actuator 970 may be driven by a single point linkage. The actuator 970 may be mechanically gear driven by any suitable mechanisms. The actuator 970 may be driven by fuel or oil hydraulic pressure, electrically, mechanically, and/or magnetically. The actuator 970 may be passively driven through a spring force driven by pressure drop across the liner. The actuator 970 may be actively driven or passively driven.

Figure 12A:
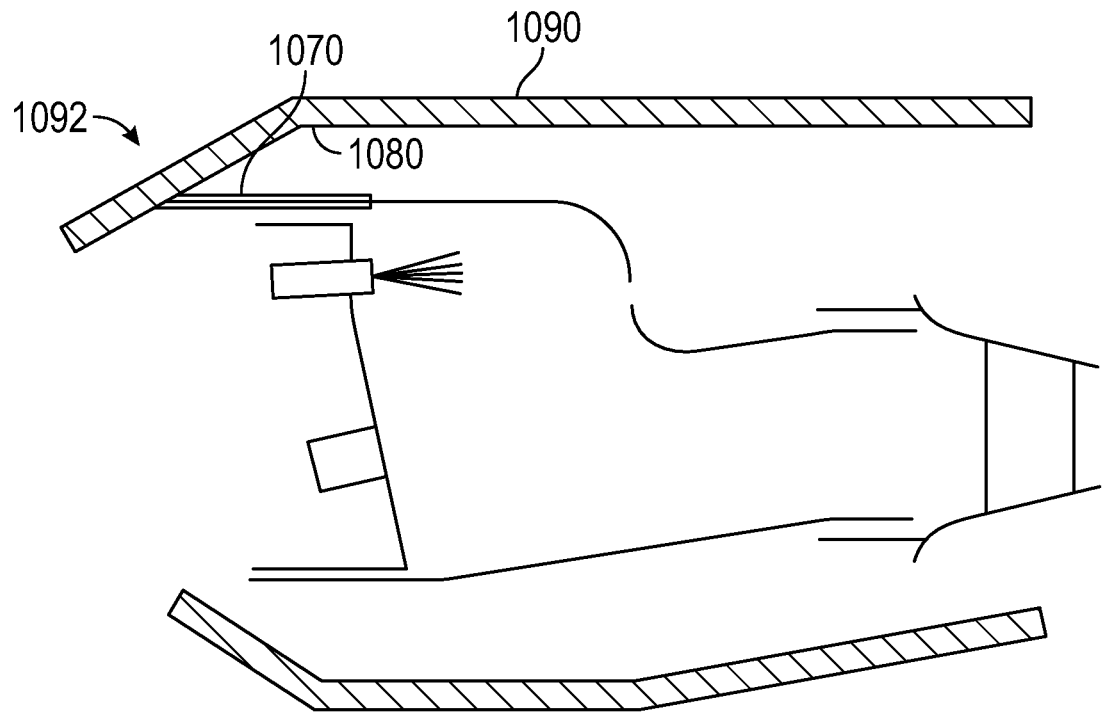
FIG. 12A shows a schematic, cross-sectional view of a trapped vortex combustor for a gas turbine engine, according to an embodiment of the present disclosure.
Figure 12B:
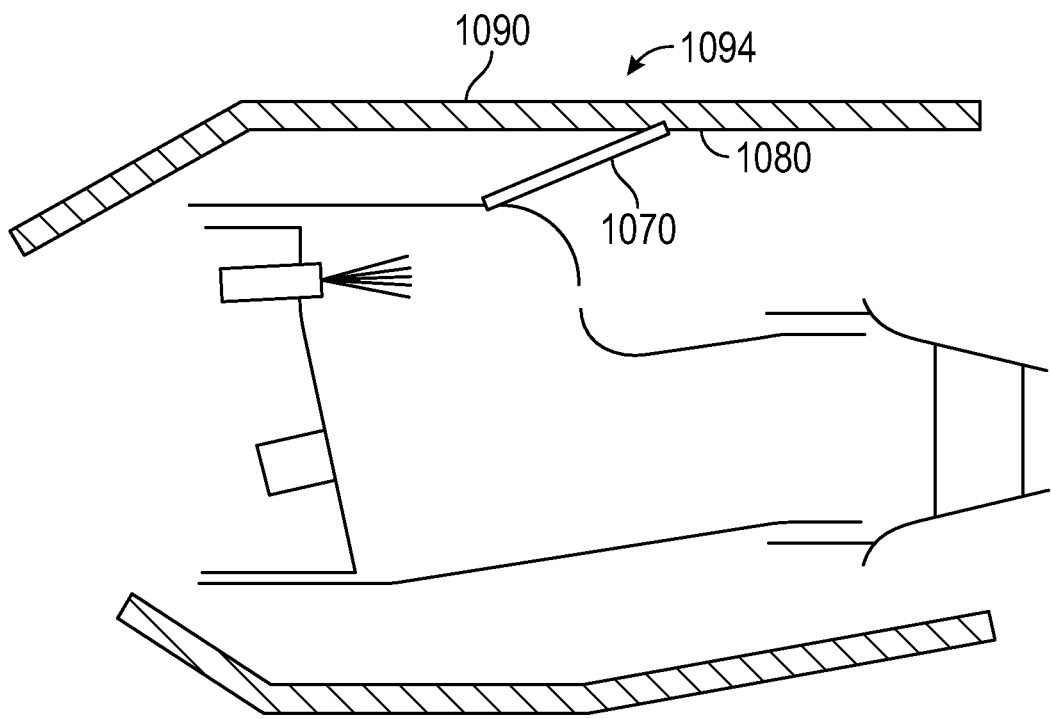
FIG. 12B shows a schematic, cross-sectional view of a trapped vortex combustor for a gas turbine engine, according to an embodiment of the present disclosure.
Figure 12C:
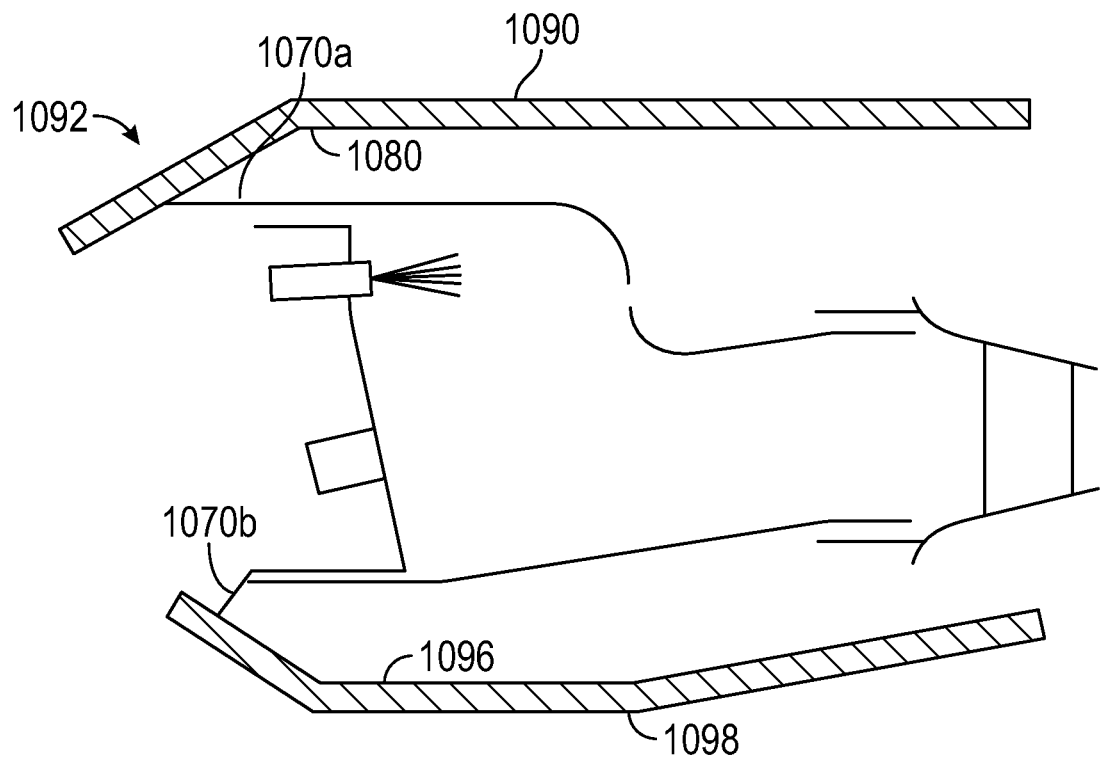
FIG. 12C shows a schematic, cross-sectional view of a trapped vortex combustor for a gas turbine engine, according to an embodiment of the present disclosure.
Figure 12D:
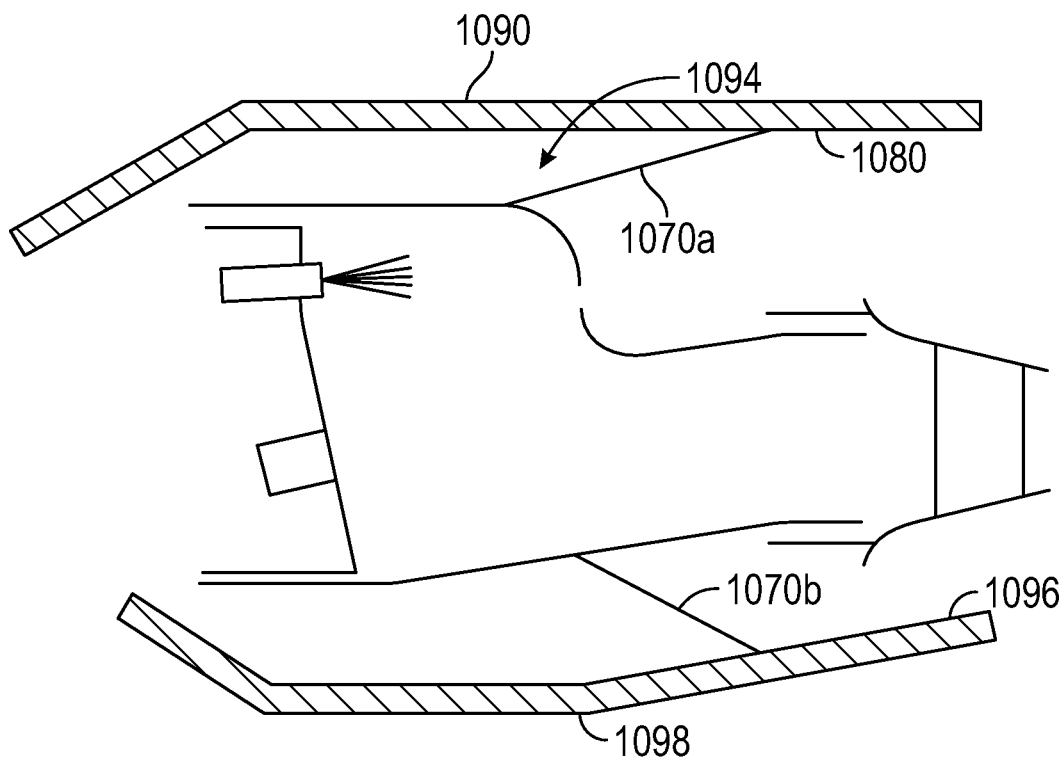
FIG. 12D shows a schematic, cross-sectional view of a trapped vortex combustor for a gas turbine engine, according to an embodiment of the present disclosure.

FIGS. 12A to 12D illustrate various exemplary actuation methods and locations that may be employed with the actuation of the outer liner, the inner liner, the dome, and/or the chutes, as described previously herein. For example, in FIGS. 12A and 12B, an actuator 1070, also referred to as a support 1070, may be mounted to an interior surface 1080 of an outer case 1090. In FIG. 12A, the mounting may be at a forward end 1092 of the combustor and, in FIG. 12B, the mounting may be at an aft end 1094 of the combustor. The support 1070 may be an integral support actuation support. In FIGS. 12C and 12D, an outer liner support 1070a may be mounted to the interior surface 1080 of the outer case 1090 and an inner liner support 1070b may be mounted to an interior surface 1096 of the inner liner 1098. In FIG. 12C, the mounting may be at the forward end 1092 and in FIG. 12D, the mounting may be at the aft end 1094.

The support 1070, including the outer liner support 1070a and the inner liner support 1070b, may be actuators that are driven by memory material or materials of different thermal growth characteristic, such as, for example, but not limited to, a shape memory alloy. Therefore, the support 1070 may be implemented as a compact actuator (FIGS. 11A to 11D) and/or through the material of a support arm (FIGS. 12A to 12D). The actuation of the memory material or materials of different thermal growth characteristics may be controlled by mounting the inner liner to the inner case and/or the outer liner to the outer case and relative growth between the cases and/or relative growth between the case and liner, which results in relative movement and, thus, primary combustion chamber (e.g., vortex cavity) volume change.

The volume may be increased to adapt to lower power conditions and to maximize residence time of the fuel in the vortex to optimize relight and lean blowout capability. Increasing the volume may also optimize low power efficiency without changing a pressure drop in the combustor. The adaptive trapped vortex combustor of the present disclosure may have a variable flow vortex cavity or a secondary zone that may be adapted to low power conditions to maximize residence time of the fuel in the vortex to optimize relight and lean blowout capability. This may increase a pressure drop in the combustor.

The volume may be decreased to adapt to high power conditions and to minimize residence time in the vortex cavity. This may minimize NOx emissions and smoke without changing a pressure drop in the combustor. The adaptive trapped vortex combustor of the present disclosure may have a variable flow vortex cavity or a secondary zone that maybe adapted to high power conditions to minimize NOx emissions and smoke, while also, optionally, decreasing a pressure drop in the combustor.

In some examples, the adaptive trapped vortex combustors of the present disclosure allow for the vortex primary zone to have a variable geometry, in which, the volume of the vortex is variable in order to optimize combustor performance across a wide range of operating conditions without impacting combustor pressure loss or flow splits.

In some examples, the adaptive trapped vortex combustors of the present disclosure allow for a variable geometry that allows for variable flow splits in the combustor without changing combustor volume in order to optimize combustor performance across a wide range of operating conditions with an option to effect or not effect pressure loss across the combustor.

In some examples, the adaptive trapped vortex combustors of the present disclosure allow for a variable geometry capable of changing both volume and flow splits. The adaptive trapped vortex combustors that provide variable volume combustors allow for performance optimization over a range of operating conditions. For example, the adaptive trapped vortex combustors may provide variable volumes that optimize the combustor volume for operability (e.g., optimize conditions for ignition and/or blow out at lower power conditions and optimize conditions for NOx and/or, smoke at high power conditions). The adaptive trapped vortex combustors of the present disclosure that provide variable flow combustors allow for performance optimization over a range of operating conditions (e.g., optimize combustor flow and internal flow splits for operability such as ignition and blow out at lower power conditions and optimize conditions for NOx and/or smoke at high power conditions).

Further aspects of the present disclosure are provided by the subject matter of the following clauses.

According to an aspect of the disclosure, an adaptive trapped vortex combustor for a gas turbine engine includes a combustion chamber defined by an outer liner, an inner liner, and a dome, the combustion chamber including a primary combustion zone within the combustion chamber, the primary combustion zone defining a vortex cavity for a trapped vortex, the vortex cavity having a volume therein, a secondary combustion zone within the combustion chamber, and an opening from the primary combustion zone to the secondary combustion zone. The combustion chamber includes a fuel injector configured to inject a fuel into the primary combustion zone and one or more chutes configured to provide an air flow to the primary combustion zone, the secondary combustion zone, or both the primary combustion zone and the secondary combustion zone. A feature of the adaptive trapped vortex combustor is controllable such that a residence time of the fuel in the vortex cavity is controllable based on an operating condition of the gas turbine engine.

The adaptive trapped vortex combustor of the preceding clause, wherein the feature controls the volume of the vortex cavity, a flow rate of the air through the one or more chutes, or a size of the opening, or any combination thereof.

The adaptive trapped vortex combustor of any preceding clause, wherein the feature is the dome, the dome being movable between a first dome position and a second dome position such that the volume of the vortex cavity is a variable volume.

The adaptive trapped vortex combustor of any preceding clause, wherein the feature is the inner liner and the dome, the inner liner and the dome being movable together between a first inner liner position and a first dome position, respectively, and a second inner liner position and a second dome position, respectively, such that the volume of the vortex cavity is a variable volume.

The adaptive trapped vortex combustor of any preceding clause, wherein the one or more chutes includes a diffuser, wherein the feature is the dome, the dome being moveable between a first dome position with respect to the diffuser and a second dome position with respect to the diffuser, and wherein the passage recoveries between the dome and the diffuser change between the first dome position and the second dome position.

The adaptive trapped vortex combustor of any preceding clause, wherein the fuel injector is located at a forward side of the vortex cavity and is configured to inject fuel in an axial direction into the primary combustion zone.

The adaptive trapped vortex combustor of any preceding clause, wherein the fuel injector is located at an aft side of the vortex cavity and is configured to inject fuel in an axial direction into the primary combustion zone.

The adaptive trapped vortex combustor of any preceding clause, wherein the fuel injector is located at the outer liner radially outward of the vortex cavity and is configured to inject fuel from in a radial direction into the primary combustion zone.

The adaptive trapped vortex combustor of any preceding clause, wherein the feature is a tapered body located in each of the one or more chutes, the tapered body being controllable in and out of the respective one or more chutes to control the air flow through the respective one or more chutes.

The adaptive trapped vortex combustor of any preceding clause, wherein the feature is actively actuated or passively actuated.

The adaptive trapped vortex combustor of any preceding clause, wherein the feature controls the volume, the volume being increased to increase residence time of the fuel in the vortex cavity and the volume is decreased to decrease residence time of the fuel in the vortex cavity.

The adaptive trapped vortex combustor of any preceding clause, wherein a pressure drop in the combustor is not changed with the controlling of the feature.

The adaptive trapped vortex combustor of any preceding clause, wherein the feature is the outer liner, the outer liner being movable between a first outer liner position and a second outer liner position such that the volume of the vortex cavity is a variable volume.

The adaptive trapped vortex combustor of any preceding clause, wherein the opening is variable, such that a size of the opening changes as the variable volume changes.

The adaptive trapped vortex combustor of any preceding clause, wherein the opening is fixed, such that a size of the opening is fixed as the variable volume changes.

The adaptive trapped vortex combustor of any preceding clause, wherein the outer liner comprises a first outer liner part and a second outer liner part, the first outer liner part moving to change the volume of the vortex cavity and the second outer liner being fixed such that a size of the opening is fixed.

The adaptive trapped vortex combustor of any preceding clause, further including an actuator to control a movement of the feature.

The adaptive trapped vortex combustor of any preceding clause, wherein the actuator is driven by fuel or oil hydraulic pressure, electrically, mechanically, and/or magnetically.

The adaptive trapped vortex combustor of any preceding clause, wherein the actuator is a memory material or a material of different thermal growth characteristic than a component to which the actuator is mounted.

According to an aspect of the disclosure, a gas turbine engine includes an outer case and an inner case and an adaptive trapped vortex combustor mounted within the outer case and the inner case. The adaptive trapped vortex combustor includes a combustion chamber defined by an outer liner, an inner liner, and a dome having a primary combustion zone within the combustion chamber, the primary combustion zone defining a vortex cavity for a trapped vortex, the vortex cavity having a volume therein, a secondary combustion zone within the combustion chamber, and an opening from the primary combustion zone to the secondary combustion zone. The adaptive trapped vortex includes a fuel injector configured to inject a fuel into the primary combustion zone and one or more chutes configured to provide an air flow to the primary combustion zone, the secondary combustion zone, or both the primary combustion zone and the secondary combustion zone. The gas turbine engine includes a turbine coupled downstream of the adaptive trapped vortex combustor. A feature of the adaptive trapped vortex combustor is controllable such that a residence time of the fuel in the vortex cavity is controllable based on an operating condition of the gas turbine engine.

The gas turbine engine of the preceding clause, wherein the feature controls the volume of the vortex cavity, a flow rate of the air through the one or more chutes, a size of the opening, or any combination thereof.

The gas turbine engine of any preceding clause, wherein the feature controls the volume of the vortex cavity, a flow rate of the air through the one or more chutes, or a size of the opening, or any combination thereof.

The gas turbine engine of any preceding clause, wherein the feature is the dome, the dome being movable between a first dome position and a second dome position such that the volume of the vortex cavity is a variable volume.

The gas turbine engine of any preceding clause, wherein the feature is the inner liner and the dome, the inner liner and the dome being movable together between a first inner liner position and a first dome position, respectively, and a second inner liner position and a second dome position, respectively, such that the volume of the vortex cavity is a variable volume.

The gas turbine engine of any preceding clause, wherein the one or more chutes includes a diffuser, wherein the feature is the dome, the dome being moveable between a first dome position with respect to the diffuser and a second dome position with respect to the diffuser, and wherein the passage recoveries between the dome and the diffuser change between the first dome position and the second dome position.

The gas turbine engine of any preceding clause, wherein the fuel injector is located at a forward side of the vortex cavity and is configured to inject fuel in an axial direction into the primary combustion zone.

The gas turbine engine of any preceding clause, wherein the fuel injector is located at an aft side of the vortex cavity and is configured to inject fuel in an axial direction into the primary combustion zone.

The gas turbine engine of any preceding clause, wherein the fuel injector is located at the outer liner radially outward of the vortex cavity and is configured to inject fuel from in a radial direction into the primary combustion zone.

The gas turbine engine of any preceding clause, wherein the feature is a tapered body located in each of the one or more chutes, the tapered body being controllable in and out of the respective one or more chutes to control the air flow through the respective one or more chutes.

The gas turbine engine of any preceding clause, wherein the feature is actively actuated or passively actuated.

The gas turbine engine of any preceding clause, wherein the feature controls the volume, the volume being increased to increase the residence time of the fuel in the vortex cavity and the volume is decreased to decrease the residence time of the fuel in the vortex cavity.

The gas turbine engine of any preceding clause, wherein a pressure drop in the combustor is not changed with the controlling of the feature.

The gas turbine engine of any preceding clause, wherein the feature is the outer liner, the outer liner being movable between a first outer liner position and a second outer liner position such that the volume of the vortex cavity is a variable volume.

The gas turbine engine of any preceding clause, wherein the opening is variable, such that a size of the opening changes as the variable volume changes.

The gas turbine engine of any preceding clause, wherein the opening is fixed, such that a size of the opening is fixed as the variable volume changes.

The gas turbine engine of any preceding clause, wherein the outer liner comprises a first outer liner part and a second outer liner part, the first outer liner part moving to change the volume of the vortex cavity and the second outer liner part being fixed such that a size of the opening is fixed.

The gas turbine engine of any preceding clause, further comprising an actuator to control a movement of the feature.

The gas turbine engine of any preceding clause, wherein the actuator is driven by fuel or oil hydraulic pressure, electrically, mechanically, and/or magnetically.

The gas turbine engine of any preceding clause, wherein the actuator is a memory material or a material of different thermal growth characteristic than a component to which the actuator is mounted.

Although the foregoing description is directed to the preferred embodiments, other variations and modifications will be apparent to those skilled in the art, and may be made without departing from the spirit or the scope of the disclosure. Moreover, features described in connection with one embodiment may be used in conjunction with other embodiments, even if not explicitly stated above.

The invention claimed is:

1. An adaptive trapped vortex combustor for a gas turbine engine,
   the adaptive trapped vortex combustor comprising:
   (A) a combustion chamber defined by an outer liner, an inner liner, and a dome, the combustion chamber including:
      (a) a primary combustion zone within the combustion chamber, the primary combustion zone defining a vortex cavity for a trapped vortex, the vortex cavity having a volume therein;
      (b) a secondary combustion zone within the combustion chamber;
      (c) an opening from the primary combustion zone to the secondary combustion zone;
   (B) a fuel injector configured to inject a fuel into the primary combustion zone; and
   (C) one or more chutes configured to provide an air flow to the primary combustion zone, the secondary combustion zone, or both the primary combustion zone and the secondary combustion zone,
   wherein a feature of the adaptive trapped vortex combustor is controllable such that a residence time of the fuel in the vortex cavity is controllable based on an operating condition of the gas turbine engine, and
   wherein the feature controls the volume of the vortex cavity, a flow rate of the air flow through the one or more chutes, or a size of the opening, or any combination thereof.

2. The adaptive trapped vortex combustor of claim 1, wherein the feature is the dome, the dome being movable between a first dome position and a second dome position such that the volume of the vortex cavity is a variable volume.

3. The adaptive trapped vortex combustor of claim 1, wherein the feature is the inner liner and the dome, the inner liner and the dome being movable together between a first inner liner position and a first dome position, respectively, and a second inner liner position and a second dome position, respectively, such that the volume of the vortex cavity is a variable volume.

4. The adaptive trapped vortex combustor of claim 1, wherein the one or more chutes includes a diffuser, wherein the feature is the dome, the dome being moveable between a first dome position with respect to the diffuser and a second dome position with respect to the diffuser, and wherein the passage recoveries between the dome and the diffuser change between the first dome position and the second dome position.

5. The adaptive trapped vortex combustor of claim 1, wherein the fuel injector is located at a forward side of the vortex cavity and is configured to inject fuel in an axial direction into the primary combustion zone.

6. The adaptive trapped vortex combustor of claim 1, wherein the fuel injector is located at an aft side of the vortex cavity and is configured to inject fuel in an axial direction into the primary combustion zone.

7. The adaptive trapped vortex combustor of claim 1, wherein the fuel injector is located at the outer liner radially outward of the vortex cavity and is configured to inject fuel from in a radial direction into the primary combustion zone.

8. The adaptive trapped vortex combustor of claim 1, wherein the feature is a tapered body located in each of the one or more chutes, the tapered body being controllable in and out of the respective one or more chutes to control the air flow through the respective one or more chutes.

9. The adaptive trapped vortex combustor of claim 1, wherein the feature is actively actuated or passively actuated.

10. The adaptive trapped vortex combustor of claim 1, wherein the feature controls the volume, the volume being increased to increase the residence time of the fuel in the vortex cavity and the volume is decreased to decrease the residence time of the fuel in the vortex cavity.

11. The adaptive trapped vortex combustor of claim 1, wherein a pressure drop in the adaptive trapped vortex combustor is not changed with the controlling of the feature.

12. The adaptive trapped vortex combustor of claim 1, wherein the feature is the outer liner, the outer liner being movable between a first outer liner position and a second outer liner position such that the volume of the vortex cavity is a variable volume.

13. The adaptive trapped vortex combustor of claim 12, wherein the opening is variable, such that a size of the opening changes as the variable volume changes.

14. The adaptive trapped vortex combustor of claim 12, wherein the opening is fixed, such that a size of the opening is fixed as the variable volume changes.

15. The adaptive trapped vortex combustor of claim 12, wherein the outer liner comprises a first outer liner part and a second outer liner part, the first outer liner part moving to change the volume of the vortex cavity and the second outer liner part being fixed such that a size of the opening is fixed.

16. The adaptive trapped vortex combustor of claim 1, further comprising an actuator to control a movement of the feature.

17. The adaptive trapped vortex combustor of claim 16, wherein the actuator is driven by fuel or oil hydraulic pressure, electrically, mechanically, and/or magnetically.

18. The adaptive trapped vortex combustor of claim 16, wherein the actuator is a memory material or a material of different thermal growth characteristic than a component to which the actuator is mounted.

19. A gas turbine engine comprising:

(A) an outer case and an inner case;

(B) an adaptive trapped vortex combustor mounted within the outer case and the inner case, the adaptive trapped vortex combustor including:

(a) a combustion chamber defined by an outer liner, an inner liner, and a dome, the combustion chamber having:

(i) a primary combustion zone within the combustion chamber, the primary combustion zone defining a vortex cavity for a trapped vortex, the vortex cavity having a volume therein;

(ii) a secondary combustion zone within the combustion chamber;

(iii) an opening from the primary combustion zone to the secondary combustion zone;

(b) a fuel injector configured to inject a fuel into the primary combustion zone; and (c) one or more chutes configured to provide an air flow to the primary combustion zone, the secondary combustion zone, or both the primary combustion zone and the secondary combustion zone; and (C) a turbine coupled downstream of the adaptive trapped vortex combustor, wherein a feature of the adaptive trapped vortex combustor is controllable such that a residence time of the fuel in the vortex cavity is controllable based on an operating condition of the gas turbine engine, and wherein the feature controls the volume of the vortex cavity, a flow rate of the air flow through the one or more chutes, or a size of the opening, or any combination thereof.

20. An adaptive trapped vortex combustor for a gas turbine engine, the adaptive trapped vortex combustor comprising:

(A) a combustion chamber defined by an outer liner, an inner liner, and a dome, the combustion chamber including:

(a) a primary combustion zone within the combustion chamber, the primary combustion zone defining a vortex cavity for a trapped vortex, the vortex cavity having a volume therein;

(b) a secondary combustion zone within the combustion chamber;

(c) an opening from the primary combustion zone to the secondary combustion zone;

(B) a fuel injector configured to inject a fuel into the primary combustion zone; and (C) one or more chutes configured to provide an air flow to the primary combustion zone, the secondary combustion zone, or both the primary combustion zone and the secondary combustion zone, wherein a feature of the adaptive trapped vortex combustor is controllable such that a residence time of the fuel in the vortex cavity is controllable based on an operating condition of the gas turbine engine, wherein a pressure drop in the adaptive trapped vortex combustor is not changed with the controlling of the feature.

* * * * *